(12) United States Patent
Kongari et al.

(10) Patent No.: US 11,068,040 B2
(45) Date of Patent: Jul. 20, 2021

(54) CLOCK GATING UNIT FOR A TRANSPONDER

(71) Applicant: NXP B.V., Eindhoven (NL)

(72) Inventors: Raghavendra Kongari, Bangalore (IN); Shankar Joshi, Bangalore (IN); Björn Rasmussen, Graz (AT)

(73) Assignee: NXP B.V., Eindhoven (NL)

( * ) Notice: Subject to any disclaimer, the term of this patent is extended or adjusted under 35 U.S.C. 154(b) by 187 days.

(21) Appl. No.: 16/406,083

(22) Filed: May 8, 2019

(65) Prior Publication Data
US 2019/0361514 A1 Nov. 28, 2019

(30) Foreign Application Priority Data
May 22, 2018 (EP) .................................. 18173666

(51) Int. Cl.
*G06F 1/32* (2019.01)
*G06K 19/07* (2006.01)
*G06F 1/3237* (2019.01)
*G06F 1/3206* (2019.01)

(52) U.S. Cl.
CPC .......... *G06F 1/3237* (2013.01); *G06F 1/3206* (2013.01); *G06K 19/0723* (2013.01)

(58) Field of Classification Search
CPC .................................................. G06F 1/3237
See application file for complete search history.

(56) References Cited

U.S. PATENT DOCUMENTS

| 5,504,485 | A | 4/1996 | Landt et al. |
| 6,314,143 | B1* | 11/2001 | Reiner ............... H04L 27/06 375/309 |
| 6,595,414 | B1* | 7/2003 | Eber ................ G06K 19/0701 235/380 |
| 7,240,838 | B2* | 7/2007 | Bui .................... G06K 7/0008 235/451 |
| 7,605,612 | B1* | 10/2009 | Chiang ............... G06F 1/3203 326/93 |
| 8,193,912 | B1 | 6/2012 | Gutnik et al. |
| 9,165,170 | B1 | 10/2015 | Gutnik et al. |
| 2006/0109087 | A1 | 5/2006 | Kim et al. |

(Continued)

FOREIGN PATENT DOCUMENTS

CN 104636691 A 5/2015

OTHER PUBLICATIONS

"Identification cards—Contactless integrated circuit(s) cards—Proximity cards—Part 2: Radio frequency power and signal interface;" International Standard ISO/IEC, Jul. 1, 2001, pp. i-vi, 1-11, No. 14443-2:2001(E).

*Primary Examiner* — Jaweed A Abbaszadeh
*Assistant Examiner* — Cheri L Harrington

(57) ABSTRACT

In accordance with a first aspect of the present disclosure, a transponder is provided, comprising: digital logic for processing one or more portions of a data frame; a status detection unit configured to detect a status of a data frame reception or data frame transmission; a clock gating unit configured to apply clock gating to said digital logic in dependence on the status of said data frame reception or data frame transmission. In accordance with further aspects of the present disclosure, a corresponding method of operating a transponder is conceived, and a corresponding computer program is provided.

13 Claims, 7 Drawing Sheets

(56) References Cited

U.S. PATENT DOCUMENTS

| | | | |
|---|---|---|---|
| 2007/0297214 A1* | 12/2007 | Dembo | G06K 19/0707 365/149 |
| 2008/0266061 A1 | 10/2008 | Stiglic et al. | |
| 2010/0231293 A1* | 9/2010 | Cho | H03D 1/06 329/347 |
| 2010/0315160 A1* | 12/2010 | Sbuell | G06K 19/0723 329/311 |
| 2015/0054571 A1 | 2/2015 | Watanabe et al. | |
| 2015/0254543 A1 | 9/2015 | Al-Kadi et al. | |
| 2015/0347791 A1 | 12/2015 | Desai et al. | |

\* cited by examiner

CLOCK GATING UNIT FOR A TRANSPONDER

CROSS-REFERENCE TO RELATED APPLICATIONS

This application claims priority under 35 U.S.C. § 119 to European Patent Application No. 18173666.1, filed on May 22, 2018, the contents of which are incorporated by reference herein.

OVERVIEW

The present disclosure relates to a transponder. Furthermore, the present disclosure relates to a method of operating a transponder, and to a corresponding computer program. A transponder, such as a radio frequency identification (RFID) transponder, may receive commands from a reader and respond to those commands. However, the communication between the transponder and the reader may be susceptible to problems. For example, some commands may not be properly received or processed by the transponder. Similarly, some responses may not be properly received or processed by the reader.

SUMMARY

In accordance with a first aspect of the present disclosure, a transponder is provided, comprising: digital logic for processing one or more portions of a data frame; a status detection unit configured to detect a status of a data frame reception or data frame transmission; a clock gating unit configured to apply clock gating to said digital logic in dependence on the status of said data frame reception or data frame transmission.

In an embodiment, detecting the status of data frame reception comprises detecting an end of a Miller pause, and the clock gating unit is configured to apply said clock gating after said Miller pause.

In an embodiment, detecting the status of data frame transmission comprises detecting that the digital logic is active during the transmission of a response, and the clock gating unit is configured to apply said clock gating while the digital logic is active.

In an embodiment, detecting that the digital logic is active comprises detecting that the digital logic is copying response data to a transmission buffer.

In an embodiment, applying the clock gating comprises disabling the digital logic during a first predefined number of clock cycles and enabling the digital logic during a second predefined number of clock cycles.

In an embodiment, the first predefined number is one and the second predefined number is one; the first predefined number is two and the second predefined number is two; or the first predefined number is three and the second predefined number is one.

In an embodiment, disabling the digital logic and enabling the digital logic are repeated.

In an embodiment, the clock gating unit is further configured to apply said disabling and enabling for a predefined maximum number of clock cycles.

In an embodiment, the first predefined number of clock cycles, the second predefined number of clock cycles, and/or the predefined maximum number of clock cycles are programmable parameters.

In an embodiment, the transponder further comprises a memory for storing said programmable parameters.

In an embodiment, said memory is a non-volatile memory.

In an embodiment, the transponder is a radio frequency identification (RFID) transponder, in particular an RFID tag or an RFID card.

In accordance with a second aspect of the present disclosure, a method of operating a transponder is conceived, the method comprising: detecting, by a status detection unit of said transponder, a status of a data frame reception or data frame transmission; applying, by a clock gating unit of said transponder, clock gating to digital logic of said transponder in dependence on the status of said data frame reception or data frame transmission; processing, by said digital logic, one or more portions of a data frame.

In accordance with the third aspect of the present disclosure, a computer program is provided, comprising instructions that, when executed by a processing unit, carry out a method of the kind set forth.

In an embodiment, a non-transitory computer-readable medium comprising a computer program of the kind set forth.

DESCRIPTION OF DRAWINGS

Embodiments will be described in more detail with reference to the appended drawings, in which.

DESCRIPTION OF EMBODIMENTS

Nowadays, RFID transponders are widely used, in different areas of industry and commerce and for various purposes. RFID transponders may for example be embodied as so-called RFID tags or RFID cards. It is noted that, in the present disclosure, near field communication (NFC) transponders are regarded as a specific type of RFID transponders. Thus, the principles described herein may also be applied to NFC transponders. As mentioned above, a transponder, such as a radio frequency identification (RFID) transponder, may receive commands from a reader and respond to those commands. However, the communication between the transponder and the reader may be susceptible to problems. For example, some commands may not be properly received or processed by the transponder. Similarly, some responses may not be properly received or processed by the reader.

Figure 1A:
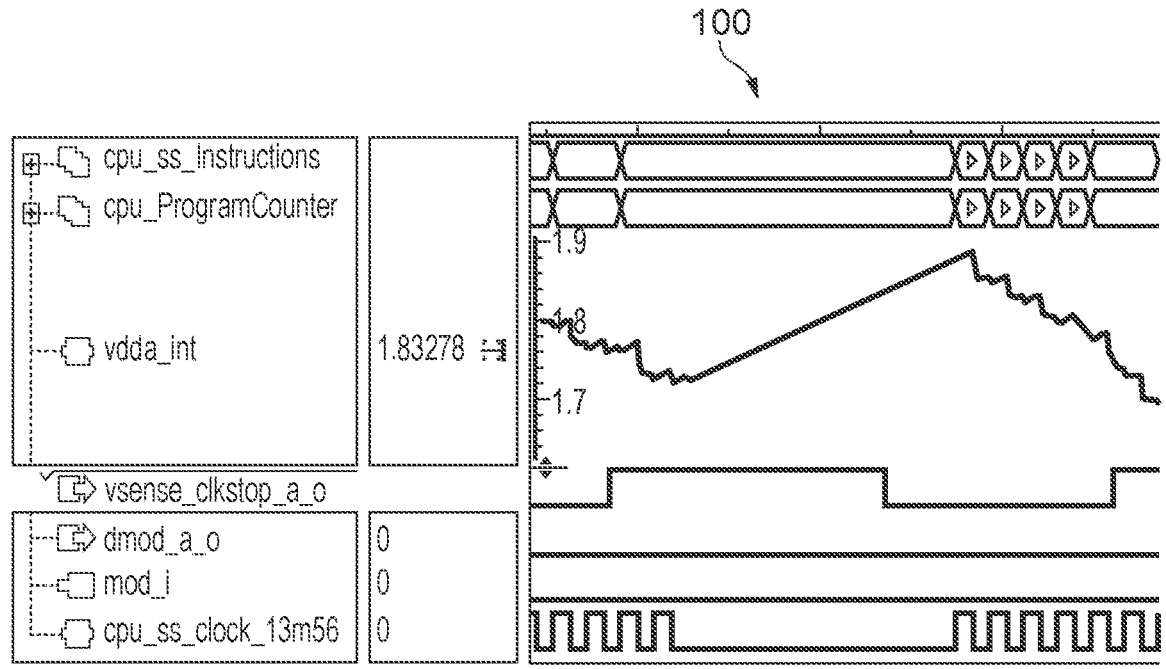
FIG. 1A shows an example of an operation of a transponder.

FIG. 1A shows an example of an operation 100 of a transponder. During communication with a reader, once a command is received by the transponder, it should be decoded, processed and a response should be transmitted back to the reader. During command reception there is often a drop of the voltage due to active digital logic which captures or processes a received command. A voltage sensor based mechanism can be used to gate clocks of most of the active digital logic momentarily to reduce power consumption and resume on voltage recovery. This is useful to avoid resets due to low voltage, particularly at lower field strengths. This is referred to as a clock-stop concept. The clock-stop concept or clock-stop feature enables achieving a higher distance of operation of the transponder from the reader (i.e. a lower minimal field strength $H_{min}$). The waveform shown in FIG. 1 illustrates that a clock-stop is triggered (vsens_clkstop_a_o) each time that the voltage drops below 1.8V (vdda_int). Thus, the digital logic clocks should be gated using vsens_clkstop_a_o. It is noted that vdda_int denotes an internal signal that represents the operating voltage of the transponder.

Figure 1B:
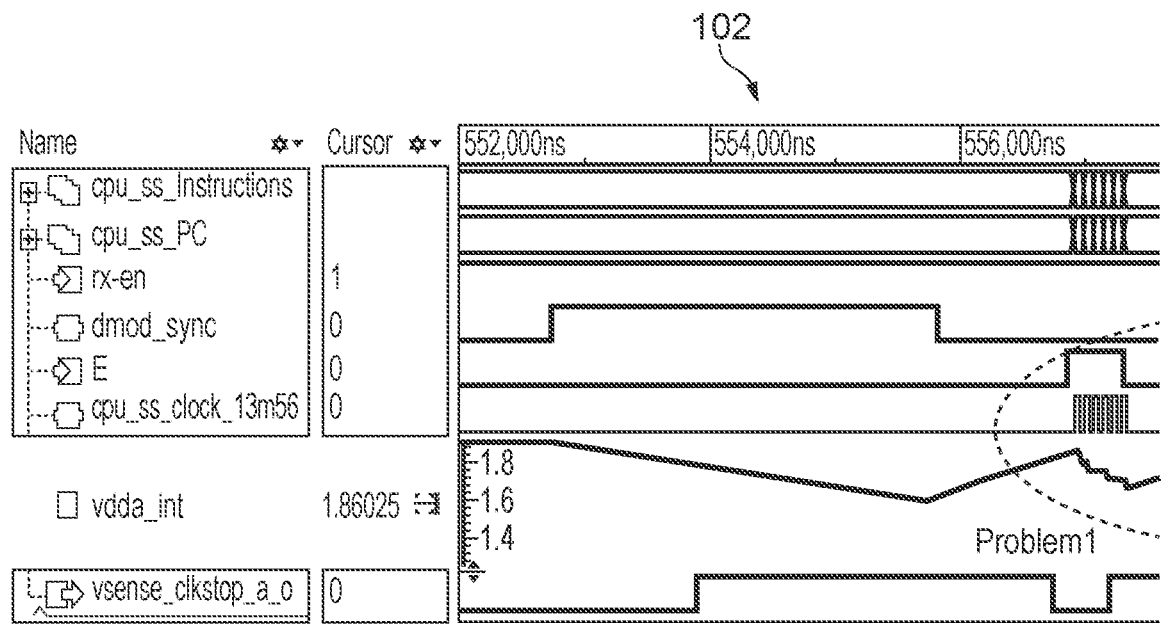
FIG. 1B shows an example of a command frame reception of a transponder.
Figure 1A:
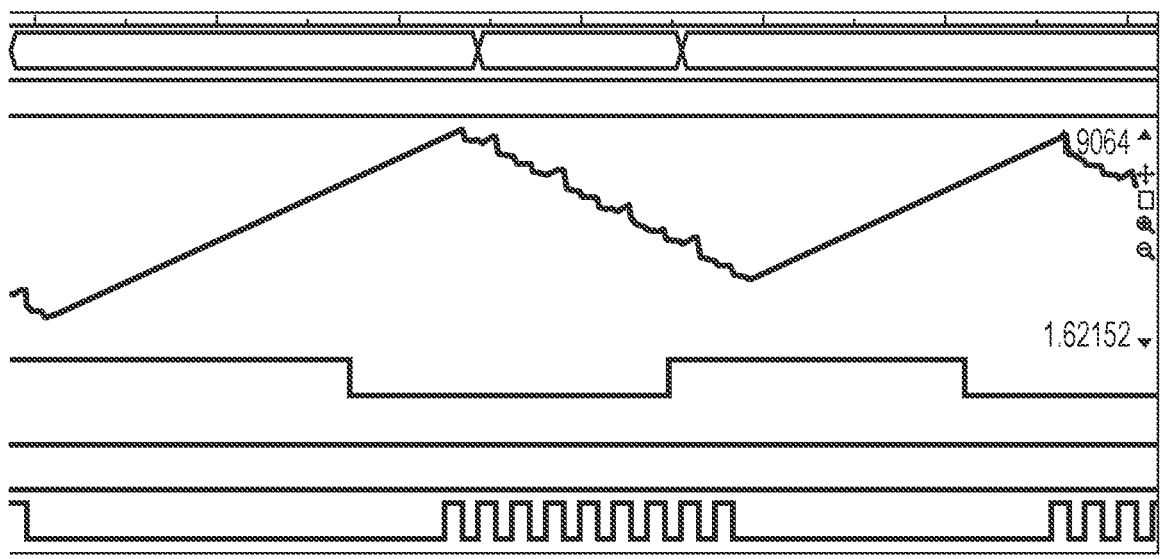
Figure 1B:
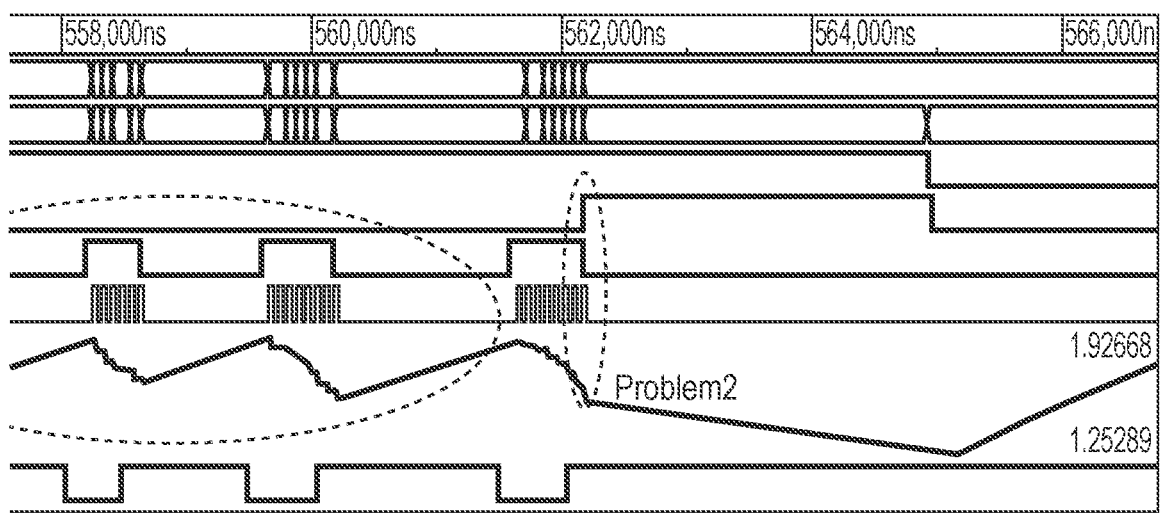

FIG. 1B shows another example of an operation 102 of a transponder. According to the technical standard ISO/IEC14443-2, section "Communication signal interface Type A", a reader communicates to a transponder a specific sequence of logical bits 0/1, which are amplitude modulated by the reader. This amplitude modulation of a created radio frequency (RF) field is referred to as a Miller pause in said technical standard ISO/IEC14443-2. During the Miller pause a transponder has low or no power. While receiving a command from a reader, to operate at lower field strength, most of the digital logic clock of an RFID transponder is gated during a demodulator Miller pause. However, the transponder's digital logic (CPU subsystem) remains ungated after the Miller pause, in order to store (i.e. process) one or more bytes of the received command frame in a transponder memory. Unfortunately, such an ungated CPU subsystem clock results in a higher digital power consumption, and the demodulator of the tag may detect such a drop of voltage as a Miller pause. This, in turn, may result in a wrong Miller decoding and not responding to the command. This may predominantly be visible for higher baud rates such as 212 kbps, 424 kbps and 848 kbps, due to a lower demodulator sensitivity to detect lower Miller pause depths (for example modulation depths of 40%).

FIG. 1B shows a simulation waveform with a command being received by the transponder (dmod_sync). After the Miller pause (dmod_sync) the digital processing starts and consumes power causing a voltage drop (vdda_int). A traditional voltage sensor based clock-stop (vsens_clkstop_a_o) is triggered after reaching a threshold voltage (1.8V). This clock-stop (vsens_clkstop_a_o) gates the digital processing until the voltage is recovered (vdda_int). A first problem is that the variation in voltage (vdda_int) between Miller pauses may be detected by the demodulator of the transponder as a wrong Miller pause. A second problem is that the starting voltage (vdda_int) at the start of the next Miller pause may drop due to the digital processing until the start of the next Miller pause; this may result in a higher minimum operating field strength ($H_{min}$) as it can trigger a low voltage reset (for example a 1.2V reset in the present example).

Similarly, another problem (not shown) may occur while a transponder transmits a response back to the reader. In particular, while transmitting said response, the transponder's digital logic copies response bytes to a transmit buffer of said transponder. Since this copying may involve an activity of the central processing unit (CPU), power drops may occur, which may become visible as noise to the reader during response detection. Generally speaking, any activity of the CPU may become visible as noise to the reader during response detection. Readers often employ a signal-to-noise ratio (SNR), and the noise generated as a result of systematic processing by the CPU may be significantly visible. This, in turn, may result in errors in the response detection by the reader, depending on the reader's response detection sensitivity.

Now a transponder and a corresponding method of operating a transponder will be discussed, which may alleviate at least some of the aforementioned problems.

In accordance with the present disclosure, a transponder is provided, comprising digital logic for processing one or more portions of a data frame, a status detection unit configured to detect a status of a data frame reception or data frame transmission, and a clock gating unit configured to apply clock gating to said digital logic in dependence on the status of said data frame reception or data frame transmission. By detecting the status of a data frame reception or data frame transmission, and applying clock gating to the digital logic in dependence on the detected status, the activity of the digital logic can effectively be controlled or tuned in dependence on the status of data frame reception or transmission. Thereby, voltage variations caused by the digital processing of a received data frame (e.g. a command frame) or a data frame that is being prepared for transmission or being transmitted (e.g. a response frame) can be avoided or at least significantly reduced. In this way, at least some of the above-mentioned errors can be avoided. It is noted that said portions of the data frame may be bytes of the data frame. However, other portions of the data frame may also be processed by the digital logic, and the presently disclosed status-dependent clock gating may be applied equally well to digital logic that processes other portions than bytes (e.g., portions comprising any number of bits).

Figure 2A:
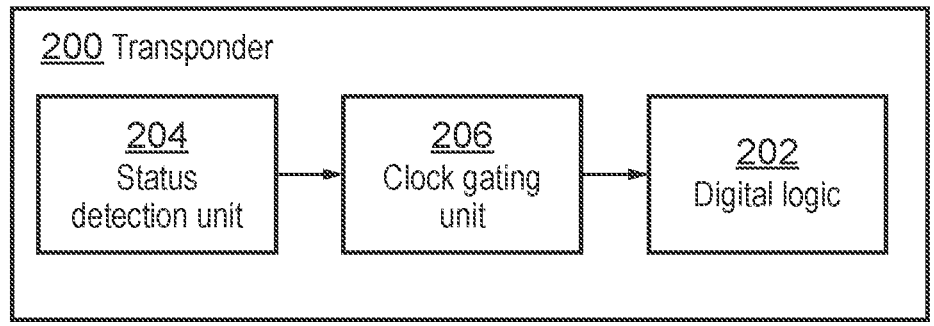
FIG. 2A shows an illustrative embodiment of a transponder.

FIG. 2A shows an illustrative embodiment of a transponder 200. The transponder 200 comprises digital logic 202, a status detection unit 204, and a clock gating unit 206. The digital logic 202 is configured to process one or more bytes of a data frame. Furthermore, the status detection unit 204 is configured to detect a status of a data frame reception or data frame transmission. Finally, the clock gating unit 206 is configured to apply clock gating to the digital logic 202 in dependence on the status of the data frame reception or in dependence on the status of the data frame transmission. Clock gating refers to stalling the clock to the digital logic and/or to preventing the system clock signal from reaching the digital logic.

Figure 2B:
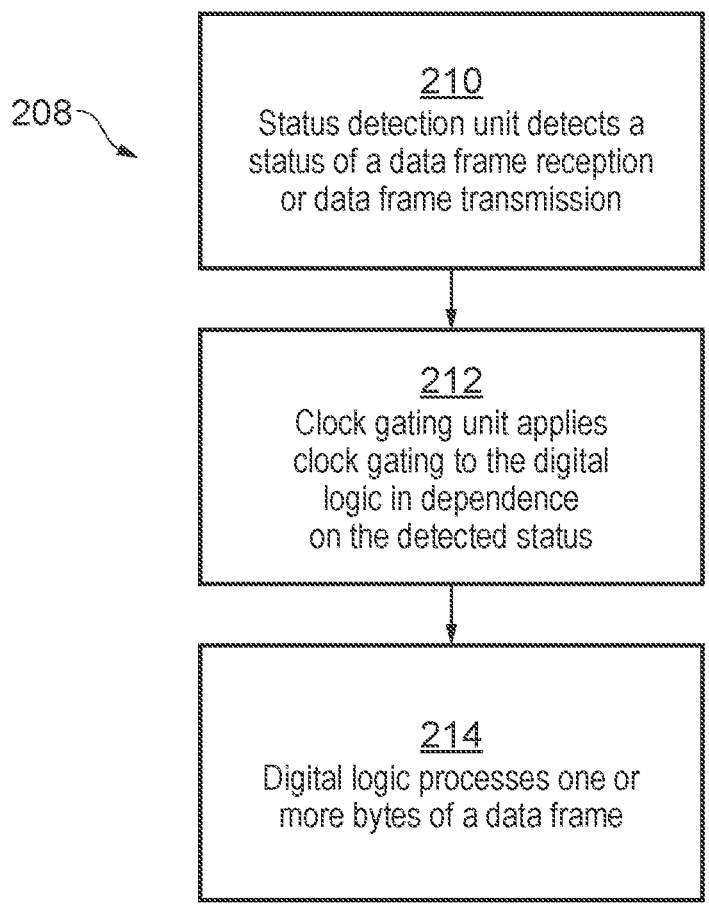
FIG. 2B shows an illustrative embodiment of a method of operating a transponder.

FIG. 2B shows an illustrative embodiment of a method 208 of operating a transponder. The method 208 comprises, at 210, that the status detection unit 204 detects a status of a data frame reception or data frame transmission, at 212, that the clock gating unit 206 applies clock gating to the digital logic 202 in dependence on the detected status, and at 214, that the digital logic 202 processes one or more bytes of a data frame.

In an embodiment, detecting the status of data frame reception comprises detecting an end of a Miller pause, and the clock gating unit is configured to apply said clock gating after said Miller pause. By default, a transponder is set to reception status to receive one or more bytes of a data frame (a command from the reader), because it cannot transmit without a command from a reader. An analog demodulator detects Miller pauses and converts the Miller pauses to digital signals, which are used for detecting logic bits 0's and 1's. A transition of such a digital signal from high to low can be regarded as the end of a Miller pause. The same digital signal may be used to gate the digital logic, because the transponder has low power or no power during Miller pause. The clock gating unit is configured to apply clock gating after the Miller pause. The digital logic is generally active to copy the byte(s) from a receive buffer to internal memory or to execute any other operations. By applying the clock gating, the power consumed by the digital logic is effectively controlled. In this way, the likelihood of a significant variation in voltage after a Miller pause may be reduced, which in turn reduces the risk that such a voltage variation is detected as a wrong Miller pause by the demodulator. Furthermore, the likelihood of a significant voltage drop at the start of the next Miller pause may also be reduced, so that the minimum operating field strength does not increase to an unacceptable level.

In an embodiment, detecting the status of data frame transmission comprises detecting that the digital logic is active during the transmission of a response, wherein the clock gating unit is configured to apply said clock gating while the digital logic is active. Furthermore, in a practical and effective implementation, detecting that the digital logic is active comprises detecting that the digital logic is copying response data to a transmission buffer. A transponder performs, once a command is received, its specific operations and prepares response data for transmission by setting the transponder status to transmission. The response data may for example comprise response bytes. During transmission a CPU subsystem is generally active to copy response data byte(s), one after the other, from internal memory to the transmit buffer or to execute any other operations. The clock gating unit is configured to apply clock gating while the digital logic is active during the transmission of a response. In this way, the likelihood that power drops occur during response transmissions may be reduced, which in turn reduces the risk of errors in the response detection by the reader.

Figure 3:
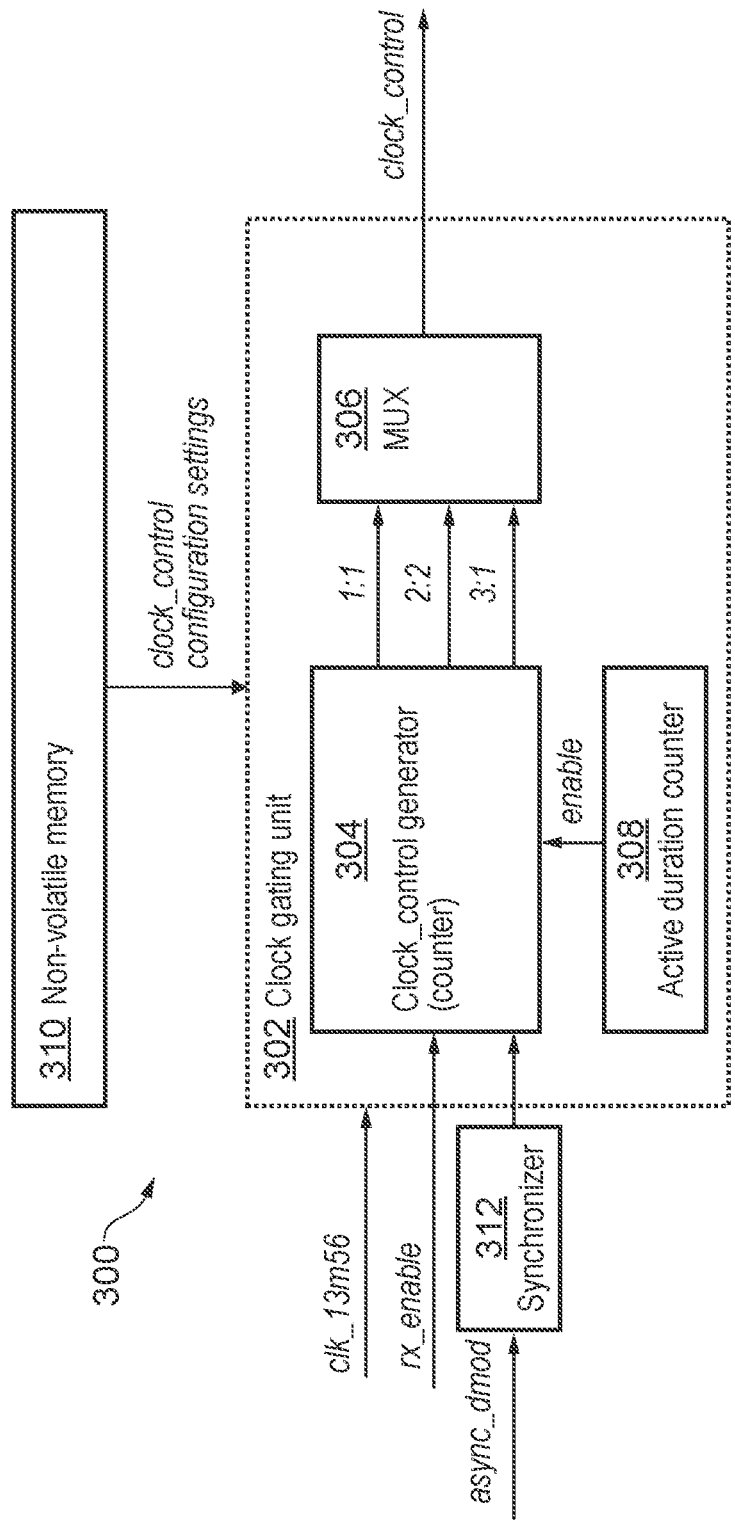
FIG. 3 shows an illustrative embodiment of a clock gating subsystem of a transponder.

FIG. 3 shows an illustrative embodiment of a clock gating subsystem 300 of a transponder. The clock gating subsystem 300 comprises a clock gating unit 302, a non-volatile memory 310, and a synchronizer 312. The clock gating unit 302 comprises a clock_control generator 304, a multiplexer 306, and an active duration counter 308. As mentioned above, a transponder's demodulator may be sensitive to the drop or rise of the voltage between the Miller pauses of a command. A capacitor is often used as a secondary power source, in addition to the power harvested from the field, which may cause the drop or rise of the voltage. In accordance with the present disclosure, the drop or rise in the voltage may be regulated by gating the digital logic clocks with a predefined clock during reception. The clock control may be optimized so as to regulate the voltage between Miller pauses and to ensure a safe capture of the command by providing a sufficient number of active clocks to perform a copy operation or to perform other digital operations. The voltage regulator logic may be configured via the non-volatile memory 310. The use of the non-volatile memory 310 results in effective and practical implementation of the clock gating mechanism. In particular, the clock_control generator 304 may retrieve clock control configuration settings (i.e. parameters) from said non-volatile memory 310. The choice of a high regulation (3:1) or medium regulation (2:2 or 1:1) can also be configured using the non-volatile memory 310. In addition, the active duration of the clock control may also be a configuration setting or parameter stored in the non-volatile memory 310. The active duration may be defined as the number of clock cycles during which the configured gated clock control is active from the end of a Miller pause. After the active duration, the clock to the digital logic is gated until the next Miller pause. The synchronizer 312 is configured to synchronize an asynchronous demodulated signal with the digital logic clock domain. The clock_control generator 304 is configured to generate different clock control signals, in dependence on the configuration settings. The configuration settings or parameters may be as follows:

1:1→ The digital logic (CPU subsystem) is disabled during one cycle of a 13.56 MHz clock and enabled during the next one cycle. This is repeated.

2:2→ The digital logic (CPU subsystem) is disabled during two cycles of a 13.56 MHz clock and enabled during the next two cycles. This is repeated.

3:1→ The digital logic (CPU subsystem) is disabled during three cycles of a 13.56 MHz clock and enabled during the next one cycle. This is repeated.

These values further enable an effective and practical implementation of the clock gating mechanism. A 2-bit counter may be used to generate these signals. This module may be enabled during command reception (rx_enable). The active duration counter 308 may be a 5-bit counter, which is used to enable the clock_control generator 304 for a configured active duration cycle count (e.g. stored as parameter act_duration in the non-volatile memory 310). If the parameter act_duration is set to 0, then this is treated as a disablement of the active duration feature. The multiplexer 306 is configured to multiplex the three types of clock-gating signals based on the configuration settings.

Figure 4:
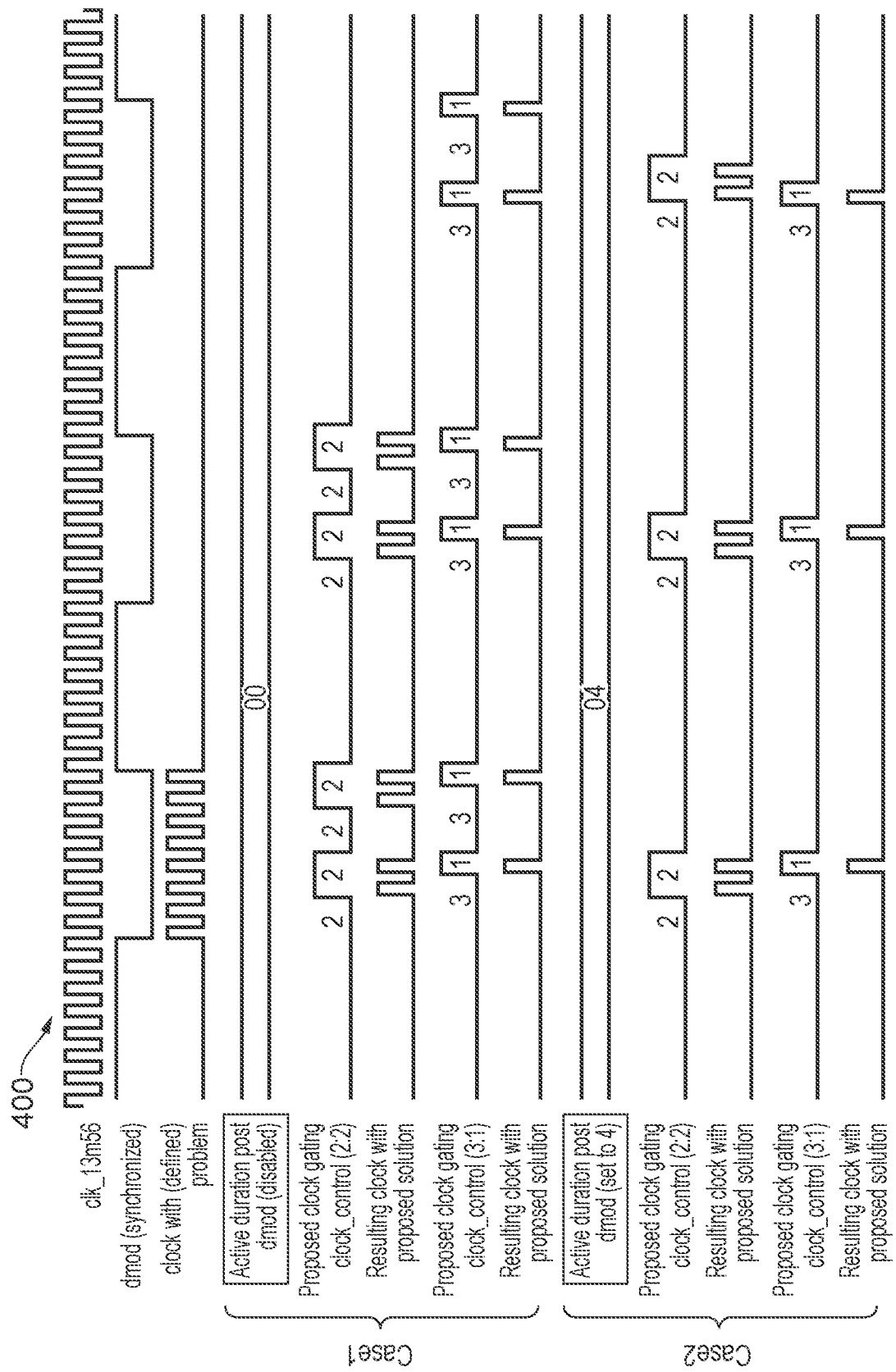
FIG. 4 shows an illustrative embodiment of the use of different programmable parameters.

FIG. 4 shows an illustrative embodiment of the use 400 of different programmable parameters. In particular, two examples are shown, in order to illustrate the use of the active duration feature. As mentioned above, the active duration may be a programmable parameter (act_duration) stored in the non-volatile memory 310. In a first case, the parameter act_duration has the value 00: this means that the feature to limit the number of active duration clocks after the Miller pause (dmod) has been disabled. In other words, it means that the configured clock gating is applied until the next Miller pause. In a second case, the parameter act_duration has the value 04: this means that the feature to limit the number of active duration clocks after the Miller pause (dmod) has been enabled and has been set to four. In other words, the configured clock gating is applied during four cycles after the end of Miller pause, and subsequently the clock is gated until the next Miller pause. Thus, in an embodiment, the clock gating unit 304 is further configured to apply a configured clock gating for a predefined maximum number of clock cycles. The configured clock gating comprises disabling the digital logic during a first predefined number of clock cycles and enabling the digital logic during a second predefined number of clock cycles. The first predefined number and the second predefined number may for example be 1 and 1, 2 and 2, respectively 3 and 1, as described above. In this way, the second problem shown in FIG. 1B may be avoided. In particular, in case the active duration is disabled, there might be active clocks until the next Miller pause, which might result in a voltage drop at the start of next Miller pause. Using the active duration, it is avoided that the active clocks encroach the next Miller pause. As a result, the voltage may be fully recovered before the next Miller pause.

Figure 5:
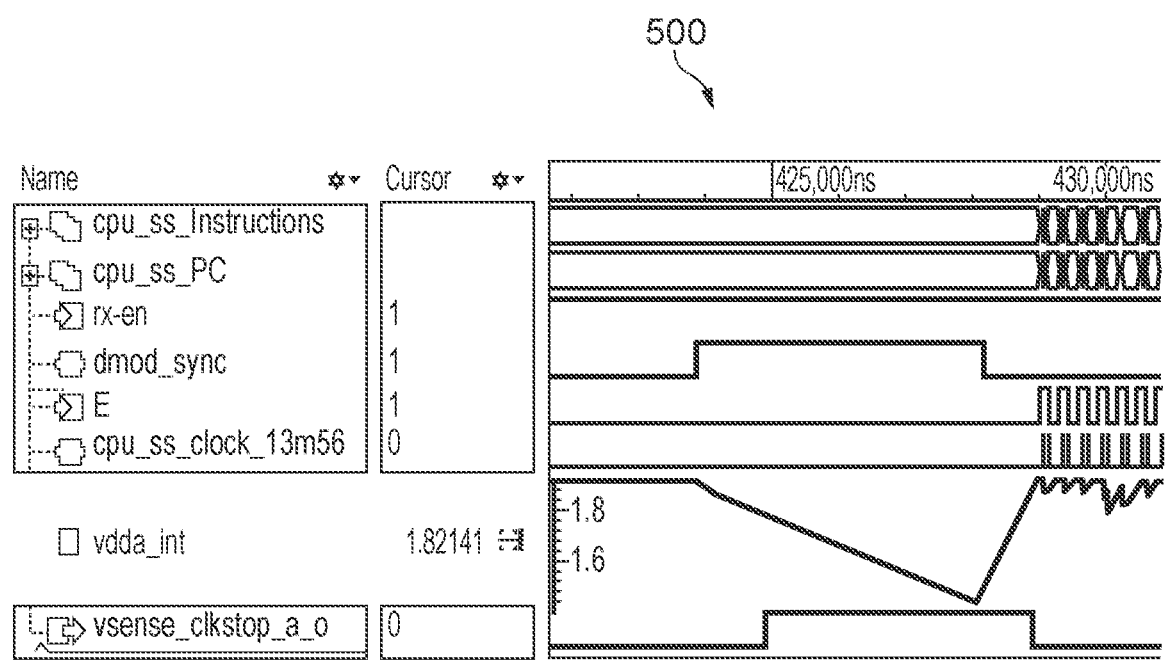
FIG. 5 shows a simulation result with applied clock gating.
Figure 5:
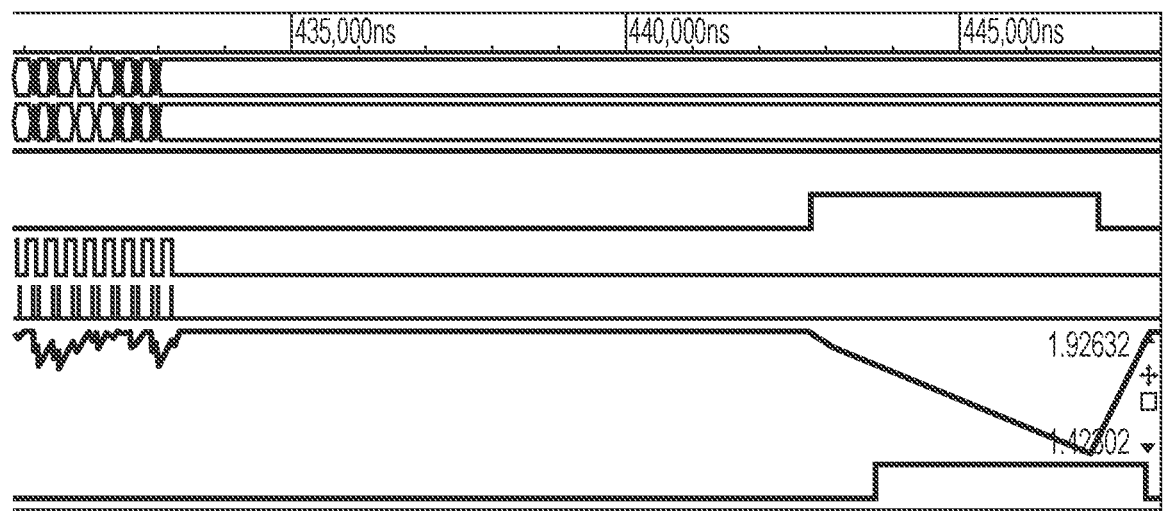

FIG. 5 shows a simulation result 500 with applied clock gating. In particular, FIG. 5 shows a simulation waveform for a command that is being received by a transponder (dmod_sync). After the Miller pause (dmod_sync) the clock-control (E) starts and the digital processing is stalled for predefined intervals to regulate the power or voltage (vdda_int). The variation in voltage (vdda_int) between Miller pauses is well regulated (not dropping below 1.8V) and also the digital processing is completed ahead of the next Miller pause. It can also be observed that the starting voltage (vdda_int) at the start of the next Miller pause is at full strength as the digital processing is completed before the next Miller pause. This may result in a lower minimum operating field strength ($H_{min}$) as it may avoid triggering a low voltage reset.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 operation of a transponder
102 operation of a transponder
200 transponder
202 digital logic
204 status detection unit
206 clock gating unit
208 method of operating a transponder
210 status detection unit detects a status of a data frame receipt or data frame transmission
212 clock gating unit applies clock gating to the digital logic in dependence on the detected status
214 digital logic processes one or more data frames
300 clock gating subsystem of transponder
302 clock gating unit
304 clock_control generator (counter)
306 multiplexer
308 active duration counter
310 non-volatile memory
312 synchronizer
400 use of different programmable parameters
500 simulation result with applied clock gating

The invention claimed is:

1. A transponder, comprising:
digital logic for processing one or more portions of a data frame;
a status detection unit configured to detect a status of a data frame reception or data frame transmission;

a clock gating unit configured to apply clock gating to said digital logic in dependence on the status of said data frame reception or data frame transmission; and an analog demodulator configured to detect a Miller pause and to convert said Miller pause to a digital signal, said Miller pause being a period in which a logical bit is amplitude modulated by a reader, wherein detecting the status of the data frame reception comprises detecting an end of said Miller pause by detecting a transition of said digital signal, and wherein the clock gating unit is configured to apply said clock gating after said Miller pause.

2. The transponder of claim 1, wherein detecting the status of data frame transmission comprises detecting that the digital logic is active during the transmission of a response, and wherein the clock gating unit is configured to apply said clock gating while the digital logic is active.

3. The transponder of claim 2, wherein detecting that the digital logic is active comprises detecting that the digital logic is copying response data to a transmission buffer.

4. The transponder of claim 1, wherein applying the clock gating comprises disabling the digital logic during a first predefined number of clock cycles and enabling the digital logic during a second predefined number of clock cycles.

5. The transponder of claim 4, wherein:
the first predefined number is one and the second predefined number is one;
the first predefined number is two and the second predefined number is two; or
the first predefined number is three and the second predefined number is one.

6. The transponder of claim 4, wherein disabling the digital logic and enabling the digital logic are repeated.

7. The transponder of claim 4, wherein the clock gating unit is further configured to apply said disabling and enabling for a predefined maximum number of clock cycles.

8. The transponder of claim 4, wherein the first predefined number of clock cycles, the second predefined number of clock cycles, and/or the predefined maximum number of clock cycles are programmable parameters.

9. The transponder of claim 8, further comprising a memory for storing said programmable parameters.

10. The transponder of claim 9, wherein said memory is a non-volatile memory.

11. The transponder of claim 1, being a radio frequency identification, RFID, transponder, in particular an RFID tag or an RFID card.

12. A method of operating a transponder, the method comprising:
detecting, by a status detection unit of said transponder, a status of a data frame reception or data frame transmission;
applying, by a clock gating unit of said transponder, clock gating to digital logic of said transponder in dependence on the status of said data frame reception or data frame transmission;
processing, by said digital logic, one or more portions of a data frame; and
detecting a Miller pause and converting said Miller pause to a digital signal, said Miller pause being a period in which a logical bit is amplitude modulated by a reader, wherein detecting the status of the data frame reception comprises detecting an end of said Miller pause by detecting a transition of said digital signal, and wherein applying, by the clock gating unit of said transponder, said clock gating to said digital logic of said transponder comprises applying said clock gating after said Miller pause.

13. A non-transitory computer-readable medium comprising computer readable instructions, which when executed by one or more processors, implements the method of claim 12.

* * * * *